United States Patent
Griffiths et al.

(10) Patent No.: US 6,813,876 B2
(45) Date of Patent: Nov. 9, 2004

(54) FUEL SYSTEM

(75) Inventors: Michael Griffiths, Bromsgrove (GB); Trevor Stanley Smith, Suttton Coldfield (GB); Glyn Dixon, Cheltenham (GB)

(73) Assignee: Goodrich Control Systems Ltd. (GB)

( * ) Notice: Subject to any disclaimer, the term of this patent is extended or adjusted under 35 U.S.C. 154(b) by 68 days.

(21) Appl. No.: 10/389,627

(22) Filed: Mar. 14, 2003

(65) Prior Publication Data

US 2004/0025492 A1 Feb. 12, 2004

(30) Foreign Application Priority Data

Mar. 15, 2002 (GB) .............................................. 0206220

(51) Int. Cl.[7] .............................................. F02C 9/26
(52) U.S. Cl. ..................................... 60/39.281; 60/746
(58) Field of Search .............................. 60/39.281, 734, 60/746

(56) References Cited

U.S. PATENT DOCUMENTS

| | | | |
|---|---|---|---|
| 5,339,636 A | 8/1994 | Donnelly et al. | |
| 5,448,882 A | * 9/1995 | Dyer et al. | .............. 60/39.281 |
| 6,655,152 B2 | * 12/2003 | Griffiths et al. | .......... 60/39.281 |
| 2004/0094118 A1 | * 5/2004 | Jonsson | ..................... 123/299 |

* cited by examiner

Primary Examiner—Louis J. Casaregola
(74) Attorney, Agent, or Firm—Andrus, Sceales, Starke & Sawall, LLP

(57) ABSTRACT

A fuel system for a gas turbine engine having a main burner fuel supply line and a pilot burner fuel supply line, a high pressure pump supplying fuel to the main and pilot burner supply lines in use, a throttle valve controlling the flow of fuel in the main burner supply line, a metering valve controlling the flow of fuel in the pilot burner supply line, and a pressure raising valve between the pilot burners and the metering valve, the pressure raising valve serving to maintain the upstream fuel pressure to a pre-determined amount in excess of the pressure of fuel supplied from the throttle valve to the main burners.

2 Claims, 3 Drawing Sheets

FUEL SYSTEM

BACKGROUND ART

It is known for a gas turbine engine to have two independently controlled sets of burners each set containing a plurality of burners, the two sets may be main burners and pilot burners. The pilot burners are arranged in parallel to receive the fuel from a pilot burner manifold, and one or more groups of main burners, the burners of each group receiving fuel from a respective main burner manifold.

It is known to supply fuel to the pilot burners through a Pressure Raising Valve (PRV) which ensures a minimum system pressure sufficient to drive various valves upstream of the PRV. The PRV receives a reference pressure against which it controls the pressure in the flow line to the pilot burners. Conventionally the reference pressure for the PRV is the low pressure fuel supply to the fuel system. It will be well understood by those skilled in the art that devices through which fuel flows, such as valves and burners in the fuel system, have a characteristic which is known as the "flow number". The flow number is representative of the flow area of the component, and thus in simple terms can be considered to be a measure of the maximum flow capability of the component. In the case of main and pilot burners their flow numbers may well be such that with all valves fully open 70% of the fuel would flow through the main burners and 30% of the fuel would flow through the pilot burners. The main and pilot burners would then be said to exhibit a 70/30 flow split. It can be shown (as will be explained in more detail hereinafter) that in a conventional system having a ratio of main/pilot burner flow numbers of 70:30, although the flow of fuel through the burners can be varied to control both the total fuel supplied to the burners and the split of that total fuel flow between the main and pilot burners, a main/pilot flow split in excess of 70/30 cannot be achieved. It is an object of the present invention to provide a fuel system wherein the control mechanism can achieve a main/pilot flow split exceeding the main/pilot burner flow number ratio.

DISCLOSURE OF INVENTION

In accordance with the present invention there is provided a fuel system for a gas turbine engine having a main burner fuel supply line and a pilot burner fuel supply line, a high pressure pump supplying fuel to the main and pilot burner supply lines in use, a throttle valve controlling the flow of fuel in the main burner supply line, a metering valve controlling the flow of fuel in the pilot burner supply line, and a pressure raising valve between the pilot burners and the metering valve, the pressure raising valve serving to maintain the system fuel pressure upstream of the pressure raising valve to a pre-determined amount in excess of the pressure of fuel supplied from the throttle valve to the main burners.

Preferably said pressure raising valve has a movable valve member exposed to fuel pressure in a reference chamber of the valve, and said reference chamber is connected in use to a fuel line from said throttle valve to said main burners whereby the pressure in said reference chamber is the pressure of fuel supplied from said throttle valve to said main burners.

BRIEF DESCRIPTION OF THE DRAWINGS

In the accompanying drawings

DETAILED DESCRIPTION OF PREFERRED EMBODIMENTS

Figure 1:
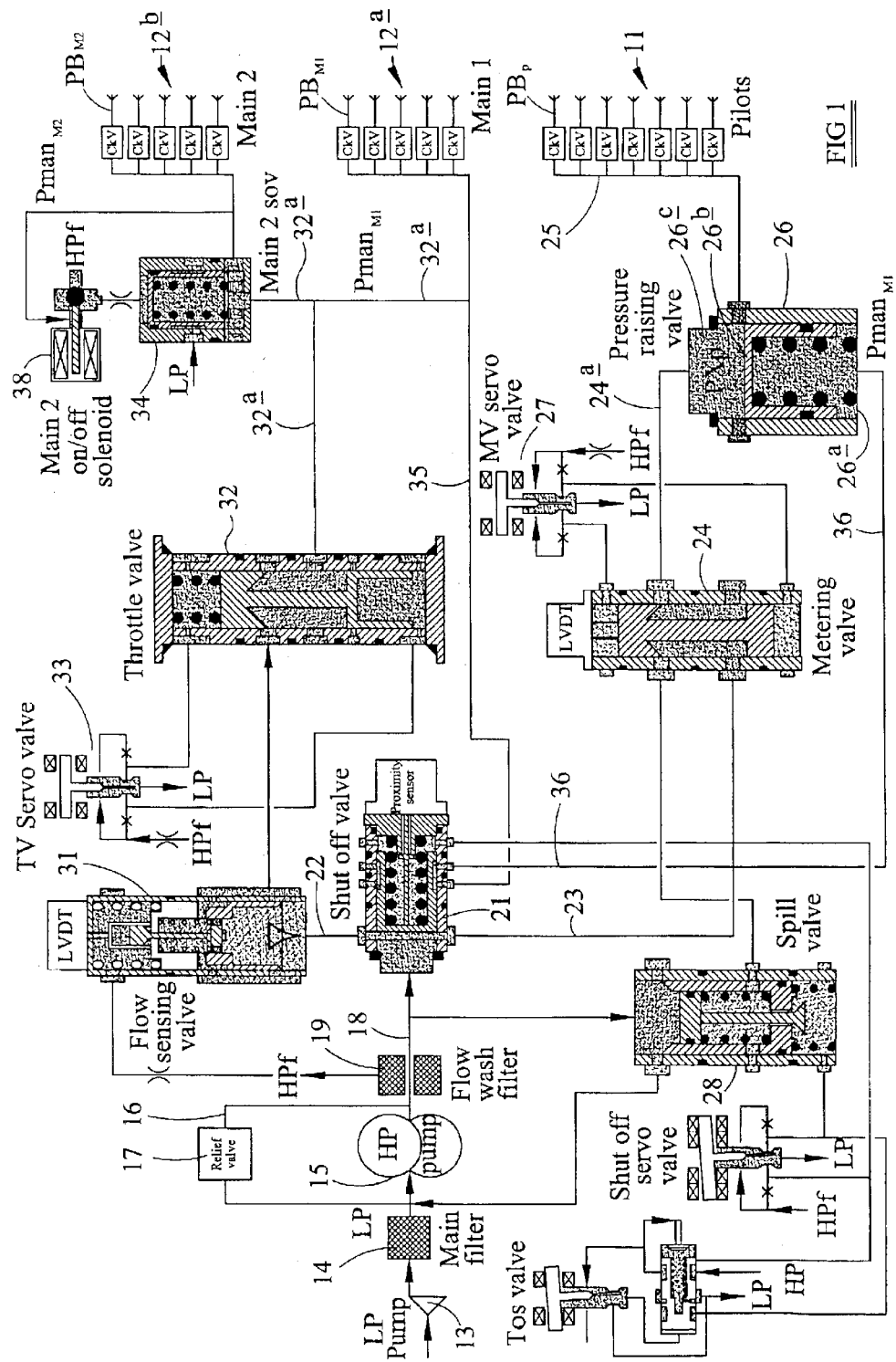
FIG. 1 is a diagrammatic representation of a gas turbine engine fuel system in accordance with one example of the present invention.

Referring first to FIG. 1 it can be seen that the fuel system includes a pilot burner assembly 11 and a main burner assembly 12, the burners being part of a gas turbine engine, and the main burner assembly being divided into sub-assemblies 12a, 12b respectively. Fuel is supplied to the burners from a fuel tank or reservoir through the fuel control system. A low pressure (LP) pump 13 draws fuel from the reservoir and supplies it at low pressure through a filter 14 to the inlet of a high pressure pump 15. The high pressure pump 15 is a gear pump driven from a gearbox of the gas turbine engine and its speed varies with engine speed. As is well known with systems of this type the pump is sized so that it always provides a fuel flow in excess of the flow required by the engine. A pressure relief valve 17 in a return line 16 acts to protect the line 18 from excess pressure. The main output line 18 from the pump 15 contains a flow wash filter 19 and the line 18 supplies fuel under high pressure to a fuel shut off valve 21 which is open during normal operation of the fuel system and which divides the flow into a main burner flow line 22 and a pilot burner flow line 23.

The pilot flow line 23 supplies fuel to a metering valve 24 for controlling the volume of fuel flowing to the pilot burners 11. The metering valve 24 supplies fuel to a pilot burner manifold 25 through a pressure raising valve 26. The operation of the metering valve is conventional, being controlled by a torque motor servo valve 27, the metering valve incorporating a linear variable displacement transducer (LVDT) to provide a valve position feedback signal to the electronic controller of the system such that the actual position of the control spool of the metering valve 24 can be verified in relation to the intended position set by operation of the servo valve 27.

A combined pressure drop regulator and spill valve 28 has an inlet connected to the high pressure line 18 and can be operated to spill fuel from the line 18 back to the low pressure side of the pump 15 to maintain the pressure drop across the metering valve 24 at a pre-determined value, for example 70 psi. Any error in the pressure drop across the metering valve causing the spill valve 28 to move to vary the amount of fuel spilled from the line 18 back to the low pressure side of the pump 18 to correct the pressure drop across the valve 24. Ensuring that the pressure drop across the metering valve 24 remains constant ensures that the flow of fuel to the pilot burner manifold 25 is purely a function of the setting of the metering valve 24.

The main burner flow line 22 supplies fuel through a flow sensing valve 31 to a main throttle valve 32. The flow sensing valve 31 measures the quantity of fuel flowing to the main burners of the engine and supplies a signal representative of the main burner flow to the electronic controller of the system. A similar signal is derived from the LVDT of the pilot metering valve 24 and the electronic controller can thus compute the total fuel flow to the engine burners, a quantity which is normally referred to as the "total burnt flow". Additionally the electronic controller can compute the ratio in which the total burnt flow is split between the main and pilot burners. The controller uses the total burnt flow as a measure of engine thrust, and controls the total burnt flow in accordance with the thrust demand set by the throttle controls of the engine. The split of fuel burnt between the main and pilot burners is controlled in accordance with Rules stored in the memory of the controller in relation to minimising emissions, for example during an aircraft take-off phase.

A throttle servo valve 33 effects control over the position of the spool of the throttle valve 32, and thus controls the setting of the throttle valve 32 and the quantity of fuel supplied to the main burners.

FIG. 1 shows sub-assemblies 12a and 12b as the main burners, and it can be seen that the throttle valve 32 supplies the burner assembly 12a directly, but supplies the burner assembly 12b through a shut-off valve 34. During operation the valve 34 may be opened, and thus the flow from the throttle valve 32 will be divided between the main burner sub-assemblies 12a and 12b in accordance with their flow numbers. In the case where the flow numbers of the two sub-assemblies are the same the flow from the throttle valve 32 will be divided equally between the two sets of main burners 12a, 12b.

It will be recognised that in the interests of simplicity it is possible to consider the main burners as a single main burner, and the pilot burners as a single pilot burner, the main burner having in this example a flow number of 70 and the pilot burner having a flow number of 30.

The pressure raising valve 26 in the supply to the pilot burners has a movable valve member 26b which is exposed on one side to pressure in a reference pressure chamber 26a of the valve and has its opposite face exposed to pressure in a main pressure chamber 26c. A compression spring acts on the valve member 26b to assist the pressure in the chamber 26a in urging the member 26b towards a valve closed position. The valve 26 will be closed at engine start-up and will open when the pressure in the line 24a from the metering valve 24 to the chamber 26c of the pressure raising valve 26 exceeds a pre-determined value (the combined effect of the pressure in chamber 26a and the spring). The pressure raising valve 26 thus sets a minimum system pressure in the pilot burner line which must be exceeded before fuel flows to the pilot burners. Conventionally the pressure at which the pressure raising valve 26 is operative is controlled by the pressure at the outlet of the LP pump 13 by a connection between the LP pump and chamber 26a. It is found however that such an arrangement has the effect that the fuel flow split between the main and pilot burners can never be set in excess of the ratio of the fuel flow number of the main burners to the fuel flow number of the pilot burners. In the present invention however the reference pressure supplied to the reference pressure chamber 26a of the pressure raising valve 26 is selected to be the pressure in the outlet line 32a from the throttle valve 32 of the main burners. As is apparent in FIG. 1 there is provided a line 35 from the main burner manifold 32a through a normally open gallery of the valve 21 and a line 36, to the reference chamber 26a of the pressure raising valve 26.

It will be recognised that during normal operation the split of fuel flow between the pilot and main burners is controlled by the setting of the throttle valve 32. When the throttle valve 32 is closed there is no flow to the main burners and the split would be 0/100 since the whole flow would be going to the pilot burners.

During normal operation of the fuel system, with the shut-off valve 21 open, the reference pressure for the valve 26 is derived through the lines 35 and 36 from the outlet of the throttle valve 32. By referencing the pressure raising valve 26 to the main burner manifold pressure, rather than to the pressure at the outlet of the LP pump as is conventional, the main/pilot burner flow split can be varied beyond the ratio of the flow numbers of the main and pilot burners. For example, although the flow numbers (the total flow areas) of the main and pilot burners may be split in the ratio 70/30, because the reference pressure for the pressure raising valve 26 is main burner manifold pressure, it is possible to achieve a 90/10 main/pilot burner flow split.

Figure 2:
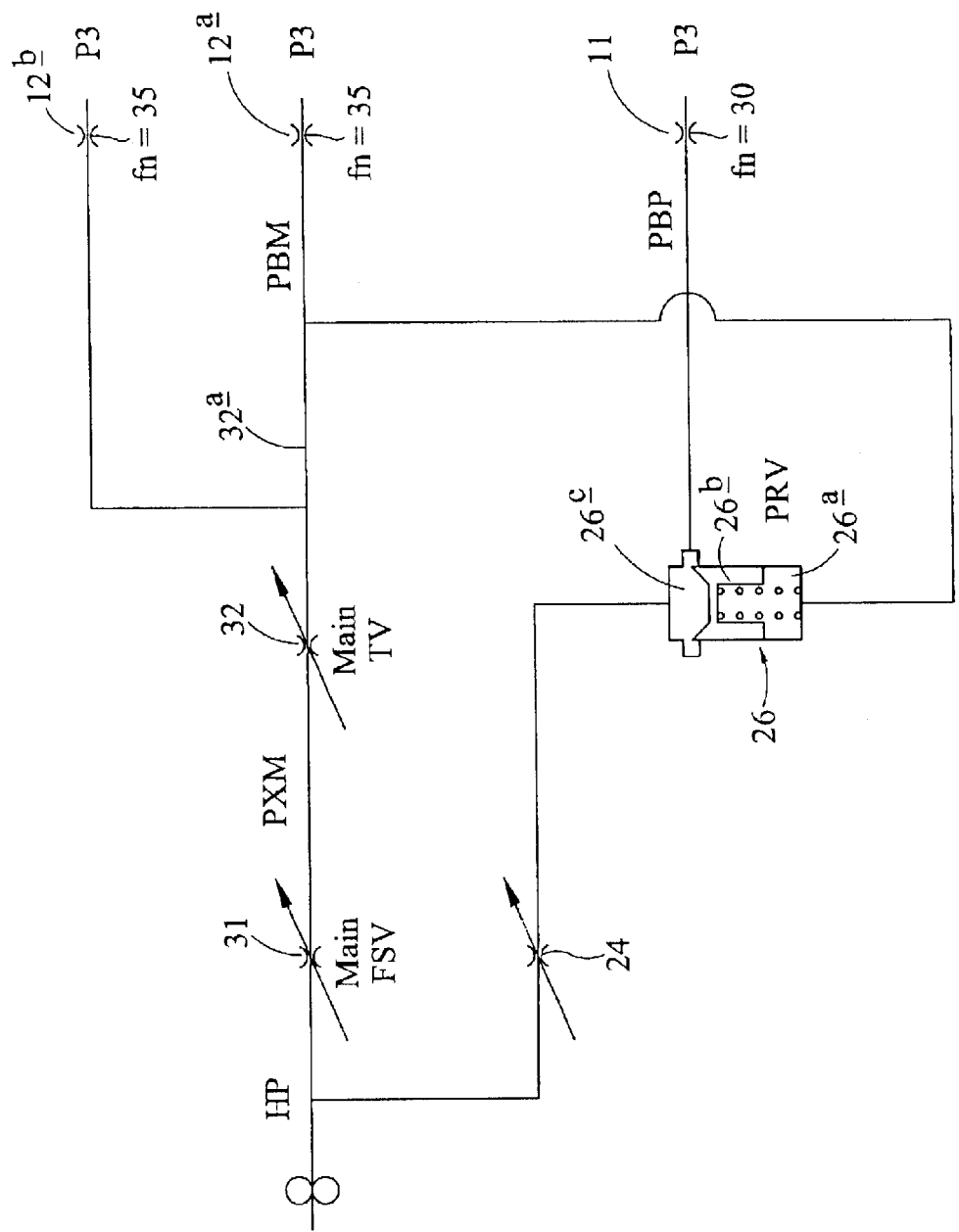
FIG. 2 is a highly diagrammatic representation of part of FIG. 1 for the purpose of explaining fuel flow calculations, and, FIG. 3 is a view similar to FIG. 2 of a prior art fuel system.
Figure 3:
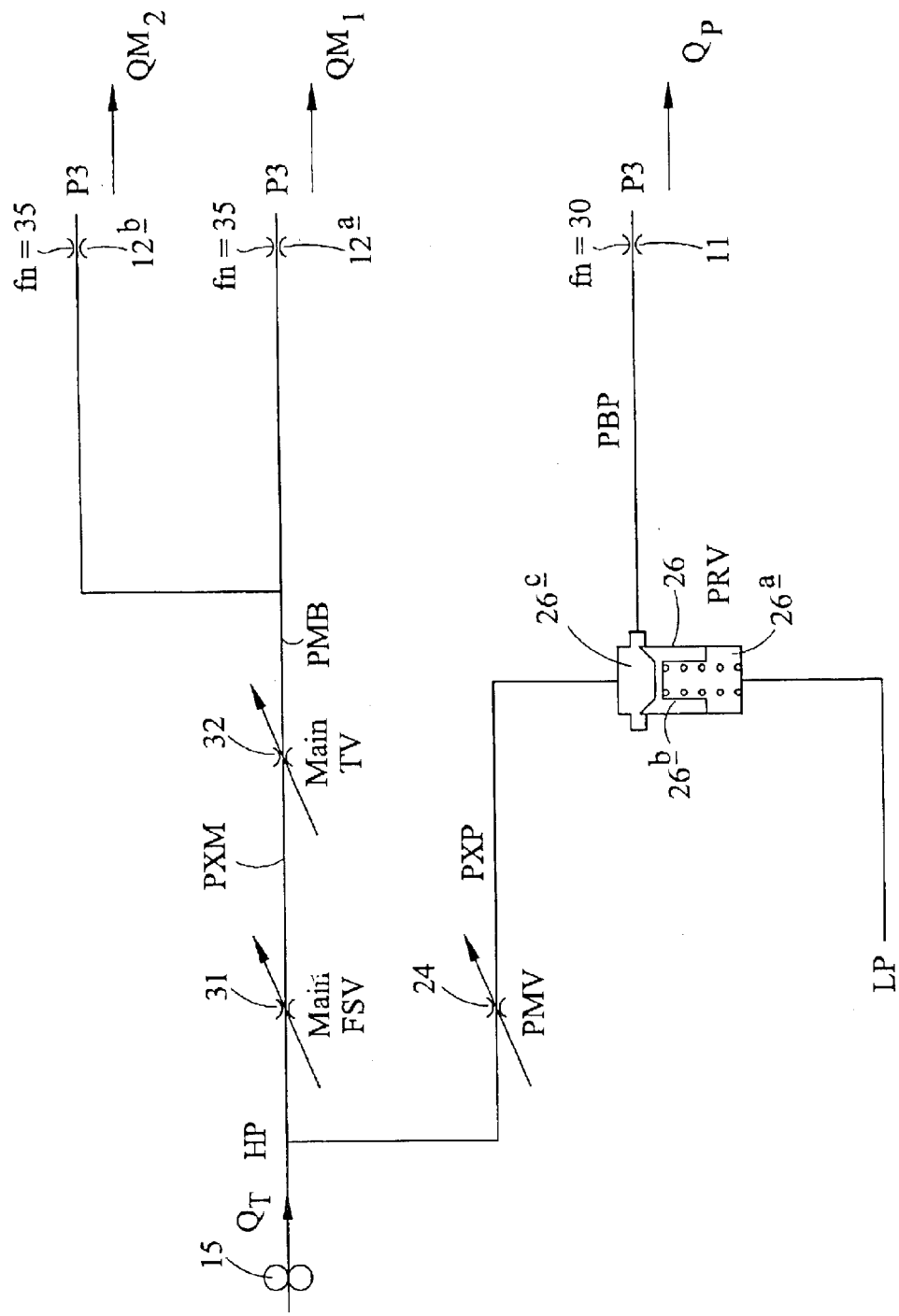

The ability to achieve a greater main/pilot split ratio is easily proved with reference to FIGS. 2 and 3. It is convenient to look firstly at the known, prior art, situation depicted in FIG. 3. Let us assume that the flow number of the main burner sub-assembly 12a is 35, and that the flow number of the main burner sub-assembly 12b is also 35. Also let us assume that the flow number of the pilot burner assembly is 30. Thus the flow number ratio main/pilot is 70/30. Let us also assume that the maximum flow through the system is 3000 gallons per hour. Since the pressure raising valve 26 takes its reference pressure from the outlet of the LP pump it will be wide open in full fuel flow conditions and let us assume that the maximum flow number of the valve 26 is 200. The design of the system limits the pressure drops across the main flow sensing valve 31 and the pilot metering valve 24 to 80 psi and we will assume that the discharge pressure $P_3$ of each burner assembly is 600 psi.

Using a main/pilot flow split of 70/30 then given a total flow of 3000 gph 900 gph flows through the pilot burners and 2100 gph flows through the main burners.

The formula $Q=fn\sqrt{Pd}$ allows us to calculate the flow Q through a flow component if we know its flow number fn and the pressure drop Pd across that component. It follows therefore that if we know the flow number and the flow quantity then we can calculate the pressure drop from the rearrangement of the above formula to give $$Pd = \left(\frac{Q}{fn}\right)^2$$

Considering firstly the pilot burners and a main/pilot flow split of 70/30 we know that the flow through the pilot burners is 900 gph and the flow number of the pilot burners is 30. Thus we can calculate a pressure drop across the burners of 900 psi and since the discharge pressure from the burners is 600 psi the pressure $P_{BP}$ upstream of the pilot burners must be 1500 psi. Using the same type of calculation we can calculate the pressure $P_{XP}$ upstream of the pressure raising valve 26 to be 1520.25 psi (the flow through the valve 26 being 900 gph and its flow number being 200). We can be sure that valve 26 will be wide open, and therefore exhibiting a flow number of 200, since the pressure $P_{XP}$ is in excess of 1500 psi, and the reference pressure from the LP pump will be around 100 psi thus giving a very significant pressure differential and ensuring that the valve 26 is fully open.

It will be recalled that we know, from the design of the system, that there is a pressure drop of 80 psi across the metering valve 24 and thus in these operating conditions the pressure HP at the outlet of the gear pump can be calculated to be 1600.25 psi. We can now calculate the pressure conditions in the main flow line, and because the pressure drop across the main flow sensing valve 31 is also, by design, 80 psi the pressure downstream of the valve 31 will be 1520.25 psi. As we know that the discharge pressure from the main burners is 600 psi and we know that the flow through the main burners is 2100 gph and furthermore as we know that the combined flow number of the main burners is 70 we can calculate that the main manifold pressure PBM upstream of the main burners is 1500 psi. We have already calculated that the pressure $P_{XM}$ downstream of the valve 31 is 1520.25 psi and thus the pressure difference across the main throttle valve 32 must be 20.25 psi. It follows therefore that we can show that in a 70/30 split situation there is a positive, finite pressure drop across the throttle valve 32 and thus it will be possible to control the position of throttle valve spool to achieve the 70/30 main burner/pilot burner flow split.

However, now consider the same system but attempting to provide a main/pilot burner flow split in excess of 70/30. For example let us assume a required flow split of 90/10. If we now repeat the calculations performed above, but with the flow through the main and pilot burners in accordance with a 90/10 split we can show that the pressure at the outlet of the gear pump 15 will be 782.25 psi and therefore the pressure $P_{XM}$ downstream of the flow sensing valve 31 will be 702.25 psi. However, calculating the pressures back from the main burners we can see that the required pressure $P_{BM}$ immediately upstream of the main burners is 2087.75 psi leading to a negative pressure difference across the throttle valve 32. Clearly the system cannot achieve a situation in which there is a negative pressure drop across the throttle valve and thus with the system shown in FIG. 3 it is impossible to achieve the desired 90/10 main/pilot flow split when the flow numbers of the main and pilot burners have the ratio 70/30.

Let us now consider the arrangement in accordance with the present invention as shown in FIGS. 1 and 2, noting that the reference pressure for the pressure raising valve 26 in the pilot burner line is derived from the manifold of the main burners. The flow number ratio of the main burners to the pilot burners remains 70/30. The total flow through the system remains at 3000 gph and thus for the desired 90/10 flow split between the main and pilot burners the pilot burners will carry 300 gph while the main burners carry 2700 gph. Using the same calculations performed above it can be calculated that PBP (the pilot manifold pressure upstream of the pilot burners) is 700 psi while the pressure $P_{BM}$ (upstream of the main burners) is 2088 psi. The pressure raising valve is set to ensure that the pressure $P_{XP}$ upstream of the pressure raising valve 26 is at least 200 psi in excess of the reference pressure for the valve 26. In this case the reference pressure is $P_{BM}$, and thus $P_{XP}$ will have a value of at least 2288 psi. If $P_{XP}$ is 2288 psi then the pressure $H_P$ at the outlet of the gear pump 15 must be 2368 psi since we know that the pressure drop across the valve 24 is, by design, 80 psi. Similarly, we know that the pressure drop across the valve 31 is 80 psi by design and thus we can calculate that pressure $P_{XM}$ downstream of the valve 31 is 2288 psi.

We have already calculated that $P_{BM}$ is 2088 psi and thus the pressure difference across the main throttle valve 32 is 200 psi. As this pressure difference is both positive and finite the throttle valve can produced the desired 90/10 flow split even though the flow number ratio of the main and pilot burners is 70/30.

It will be recognised therefore that in the system illustrated in FIG. 3 where the pressure raising valve 26 takes its reference pressure from the LP pump 13, it is not possible to achieve a main/pilot flow split that greatly exceeds the main/pilot burner flow number split. At high flows the valve 26 is wide open and the maximum system pressure $H_P$ required to pass the pilot flow through the restrictions in the pilot line is insufficient to pass the required main flow through the restrictions in the main burner flow line. Even with the main throttle valve 32 wide open the overall flow number of the main burner flow line from the gear pump 15 through the main burners, cannot be greater than the flow number of the main burners themselves. However, in the arrangement illustrated in FIG. 2 where the valve 26 takes its reference pressure from the main burner manifold, the pressure upstream of the valve 26 is not related to the pressure downstream of the valve 26. Instead the pressure upstream of the valve 26 is set to be at least 200 psi above the pressure in the main burner manifold, the valve 26 remaining active (rather than being against its fully open stop). In this situation therefore the pressure $H_P$ at the outlet of the gear pump is high and there is always sufficient pressure drop across the main throttle valve 32 to ensure that the valve 32 can be operated to control the flow split between the main and pilot burners.

Although it is not crucial to an understanding of the present invention it will be recognised that FIG. 1 illustrates a main burner situation in which the main burner flow is divided, during normal operation, between two sets 12a and 12b of main burners. As mentioned previously the burners of the main burner set 12b are supplied with fuel through a Shut-Off Valve 34. The Shut-Off Valve 34 is controlled by a solenoid 38 which determines whether the valve 34 is open or closed, and thus whether fuel is supplied to the burners 12b, or not. The rate of opening of the valve 34 is controlled by the pressure drop across the valve 34 and across a fixed orifice (not shown) positioned between the valve 34 and a control pressure input of the solenoid 38. The porting of the valve 34 is arranged to minimise any dip in the flow to the burners 12a when the valve 34 opens. The valve 34 has a port which permits a small flow to the burners 12b to prime the burners 12b and this, together with a high pressure drop across the main ports of the valve 34 serves to limit the dip in flow to the burners 12a which occurs when the valve 34 opens to supply fuel to the burners 12b. Thus when the valve 34 is moved to an open position the initial effect is to supply a priming flow through the priming port, and also to use the flow displaced by the piston of the valve 34 in it open movement, to prime the burners 12b. Once the burners 12b are primed the valve 34 travels to its fully opened position in which it produces a negligible flow restriction whereby the split between the burners 12a and 12b is parity.

In practice both sets of burners 12, 12b are primed with fuel at LP pump pressure while the engine is operating even when one or more of the main burners are deselected, and thus are not "burning". The priming with low pressure fuel enables a rapid ignition of the main stages of the burners when necessary since there is no requirement to prime the main burner system each time a main burner is to be selected. When the main throttle valve 32 is closed, ports in its control sleeve feed low pressure fuel to the manifold of the burners 12a to keep that manifold primed. Similarly ports in the valve 34 prime the manifold 12b with low pressure fuel when the valve 34 is closed. Check valves located at the head of the injector stem of each burner prevent leakage to the burners so that the low pressure fuel in the manifold is maintained in the manifold and does not leak through the burners. When the manifolds are supplied with high pressure fuel the check valves open.

Normal shut-down of the system can be achieved by the pilot of the aircraft equipped with the fuel system selecting "cut-off" thereby energising control valves to supply high pressure fuel from the pump 15 to the rear of the spool of the Shut-Off Valve 21 and also to the reference pressure chamber of the pressure raising valve 26, so that both valves are driven to their closed position by the high pressure fuel. Simultaneously the servo pressure of the control mechanism of the spill valve 28 is vented to the low pressure side of the system, conveniently back to the fuel reservoir, so that the spill valve opens fully to spill all of the flow from the pump 15 back to the low pressure side of the pump. Two switching ports in the valve 21 control the pressure supplied to the reference chamber of the valve 26 through the line 36. During normal operation when the valve 21 is open the switching ports connect the line 35 to the line 36 so that the reference chamber of the valve 26 sees the pressure in the main burner manifold. However, when the system is in "shut-down" mode the valve 21 closes the port connecting the line 35 to the line 36 and immediately thereafter connects the line 36 to the high pressure line 18 thereby driving the valve 26 to a closed condition and cutting off the fuel flow to the pilot burners 11. This ensures that the valve 26 remains closed even though the engine may be windmilling.

What is claimed is:

1. A fuel system for a gas turbine engine having a main burner fuel supply line and a pilot burner fuel supply line, a high pressure pump supplying fuel to the main and pilot burner supply lines in use, a throttle valve controlling the flow of fuel in the main burner supply line, a metering valve controlling the flow of fuel in the pilot burner supply line, and a pressure raising valve between the pilot burners and the metering valve, the pressure raising valve serving to maintain the system fuel pressure upstream of the pressure raising valve to a pre-determined amount in excess of the pressure of fuel supplied from the throttle valve to the main burners.

2. A fuel system as claimed in claim 1 wherein said pressure raising valve has a movable valve member exposed to fuel pressure in a reference chamber of the valve, and said reference chamber is connected in use to a fuel line from said throttle valve to said main burners whereby the pressure in said reference chamber is the pressure of fuel supplied from said throttle valve to said main burners.

\* \* \* \* \*